United States Patent
Scheurwater

(10) Patent No.: US 10,406,437 B1
(45) Date of Patent: Sep. 10, 2019

(54) ROUTE NAVIGATION SYSTEM WITHIN A GAME APPLICATION ENVIRONMENT

(71) Applicant: Electronic Arts Inc., Redwood City, CA (US)

(72) Inventor: Mark Scheurwater, Stockholm (SE)

(73) Assignee: ELECTRONIC ARTS INC., Redwood City, CA (US)

( * ) Notice: Subject to any disclaimer, the term of this patent is extended or adjusted under 35 U.S.C. 154(b) by 412 days.

(21) Appl. No.: 14/871,427

(22) Filed: Sep. 30, 2015

(51) Int. Cl.
| | |
|---|---|
| *G06F 3/0481* | (2013.01) |
| *A63F 13/537* | (2014.01) |
| *A63F 13/30* | (2014.01) |
| *A63F 13/825* | (2014.01) |
| *A63F 13/23* | (2014.01) |
| *A63F 13/95* | (2014.01) |

(52) U.S. Cl.
CPC ............ *A63F 13/537* (2014.09); *A63F 13/23* (2014.09); *A63F 13/30* (2014.09); *A63F 13/825* (2014.09); *A63F 13/95* (2014.09); *G06F 3/04812* (2013.01); *G06F 3/04815* (2013.01)

(58) Field of Classification Search
CPC ............... G06F 3/0481; G06F 3/04812; G06F 3/04815; A63F 13/537; A63F 13/30; A63F 13/825; A63F 13/23; A63F 13/95
See application file for complete search history.

(56) References Cited

U.S. PATENT DOCUMENTS

| | | | |
|---|---|---|---|
| 2004/0063501 A1* | 4/2004 | Shimokawa | ............ A63F 13/10 463/49 |
| 2007/0198178 A1* | 8/2007 | Trimby | .................. G06N 5/003 701/533 |

* cited by examiner

*Primary Examiner* — Kang Hu
*Assistant Examiner* — Thomas H Henry
(74) *Attorney, Agent, or Firm* — Knobbe, Martens, Olson & Bear, LLP

(57) ABSTRACT

Embodiments of the present disclosure provide a route navigation system that can aid the user by providing navigational aids for navigating within a virtual game environment. The navigational aids can provide visual indications to the user within the game environment in order to help direct the character to navigation objects used for traversing the environment. The navigation information used for navigation within the game environment can be determined based on a route navigation grid. A navigation module can utilize the navigation grid to help users navigate characters within the game environments of the game application. The route navigation grid can be generated based on aggregated route information and telemetry data associated with a plurality of users of the game application. The route generation module can be configured to automatically generate navigation links between navigation nodes within game environment based on telemetric data sourced from users of the game application.

20 Claims, 14 Drawing Sheets

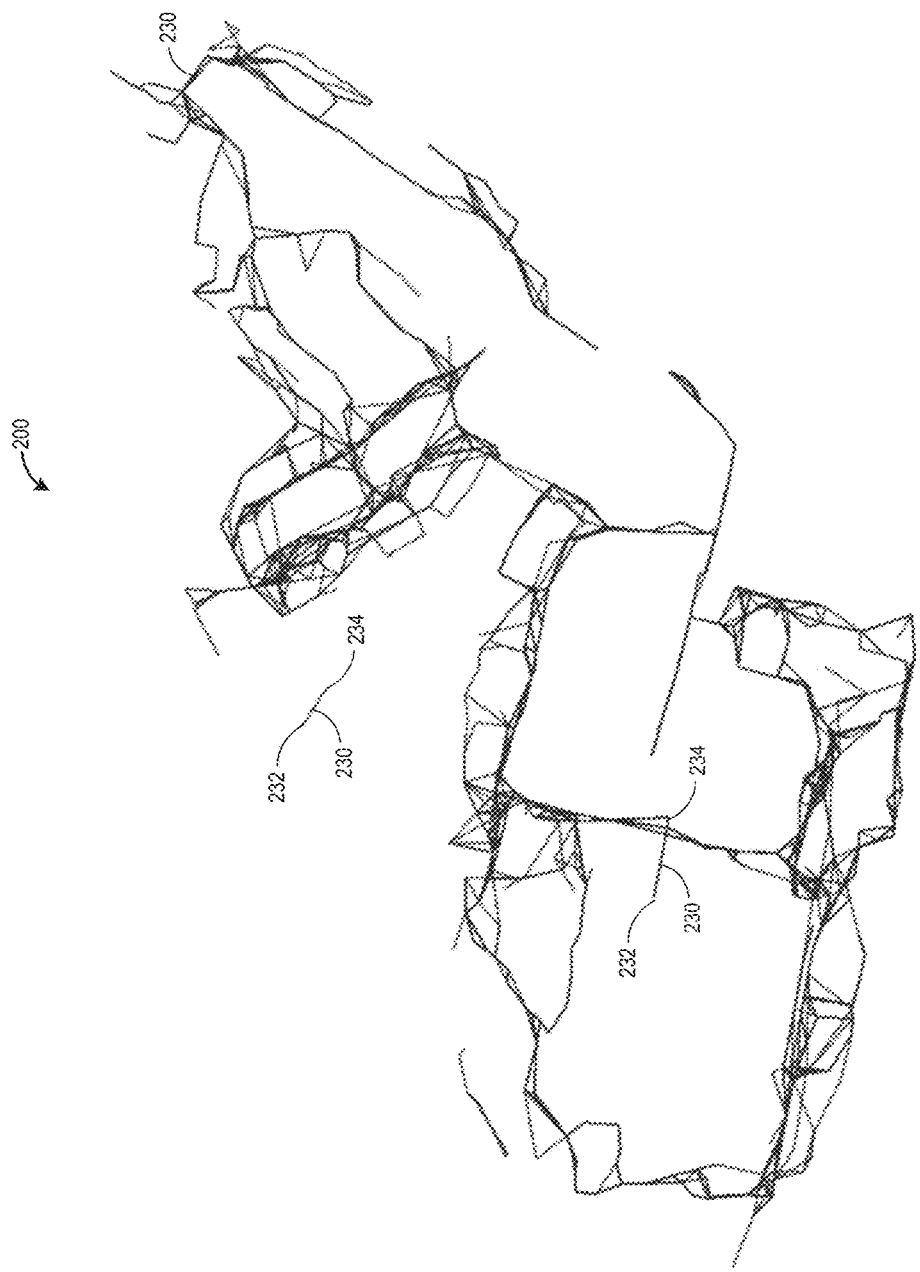

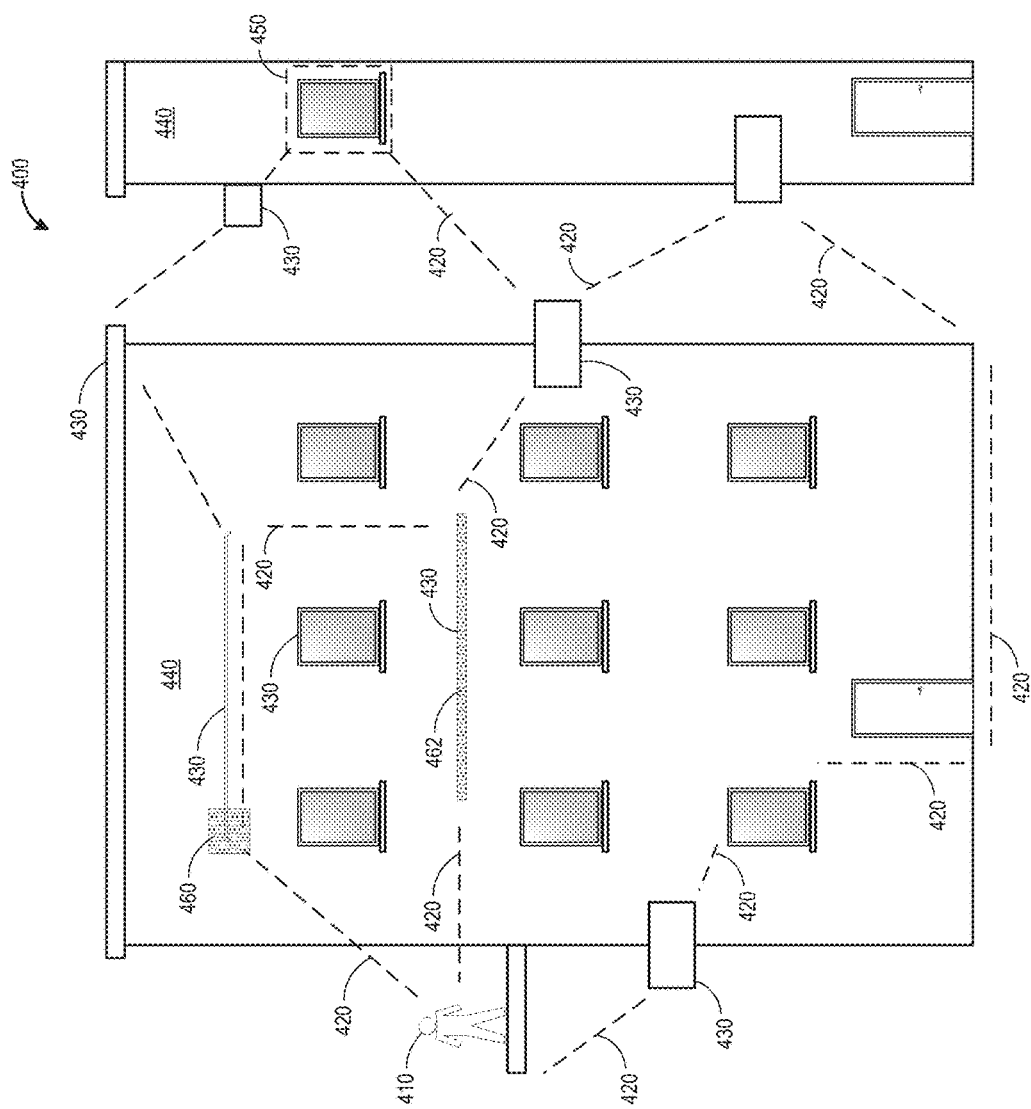

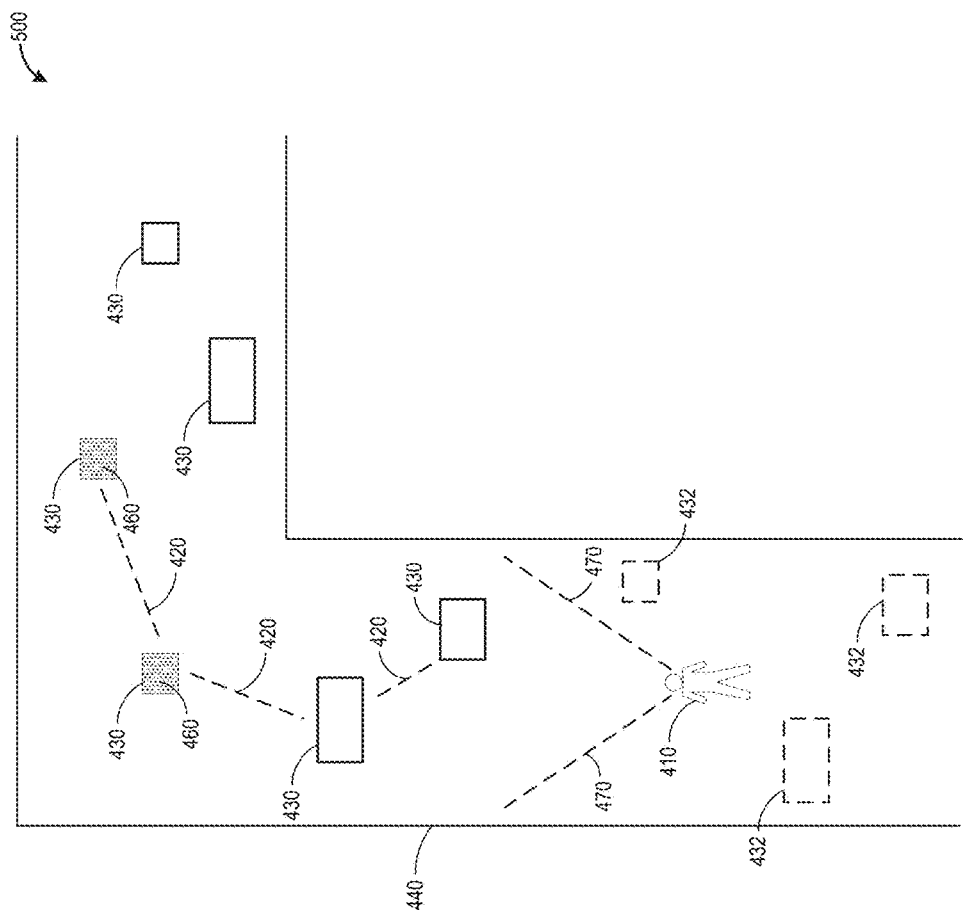

ROUTE NAVIGATION SYSTEM WITHIN A GAME APPLICATION ENVIRONMENT

BACKGROUND

In video games, users can navigate in-game characters through levels to reach a destination, such as the end of a level. Generally, game levels within a game have a start point and an end point. Video games can include two-dimensional and three-dimensional game environments. For example, in a side scrolling two-dimensional game a player may follow a linear path from the start to the end of a level. In more complex games, the video game may provide various navigation options to help for a user to navigate within the game environment. For example, a video game may include a mini-map or in-game map that the user can consult to determine the location of the character and the destination. The map may include an indication illustrating the location of the character an indication illustrating a destination. These methods can be cumbersome for a user to constantly check the map to determine how to navigate to the desired location.

SUMMARY OF EMBODIMENTS

The systems, methods, and devices of this disclosure each have several innovative aspects, no single one of which is solely responsible for the all of the desirable attributes disclosed herein.

One embodiment discloses A computer-implemented method for route navigation within a game environment of a game application: by a hardware processor configured with computer executable instructions, executing a game application comprising a game environment, the game environment comprising a plurality of navigation objects of structural elements, a navigation grid comprising a plurality of navigation links defining routes between the plurality of navigation objects, wherein each of the plurality of navigation objects is associated with one or more navigation links; determining a start point based, at least in part, on a location of a virtual character within the game environment, wherein the game environment further comprises a destination point for the virtual character within the game environment; determining an orientation of the virtual character within the game environment, identifying a first set of navigation objects based, at least in part, on the location of the character, the first set of navigation objects comprising one or more navigation objects of the plurality of navigation objects; filtering the first set of navigation objects based, at least in part, on an orientation threshold associated with the orientation of the virtual character within the game environment to generate a first subset of active navigation objects comprising a subset of navigation objects of the first set; determining a route between the start point and the destination point based, at least in part, on the navigation grid and one or more route determination factors, wherein the route comprises a first set of navigation links of the plurality of navigation links connecting the start point and the destination point within the navigation grid, and at least one selected active navigation object of the first subset of active navigation objects; and generating a first visual indication within the game environment identifying the at least one selected active navigation object of the first subset of active navigation objects.

Another embodiment discloses A computing system comprising a data store storage device configured to store computer readable instruction configured to execute a game application and a navigation grid comprising a plurality of navigation links defining routes between the plurality of navigation objects, wherein each of the plurality of navigation objects is associated with one or more navigation links; a processor configured to execute the game application, the game application configured to generate a game environment including a plurality of navigation objects, the game application comprising a route navigation module configured to: determine a start point based at least in part on a location of a virtual character within the game environment, wherein the game environment comprises a destination point for the virtual character within the game environment; determine an orientation of the virtual character within the game environment; identify a first set of navigation objects based, at least in part, on the location of the character, the first set of navigation objects comprising one or more navigation objects of the plurality of navigation objects; filter the first set of navigation objects based, at least in part, on an orientation threshold associated with the orientation of the virtual character within the game environment to generate a first subset of active navigation objects comprising a subset of navigation objects of the first set; determine a route between the start point and the destination point based, at least in part, on the navigation grid and one or more route determination factors, wherein the route comprises a first set of navigation links of the plurality of navigation links connecting the start point and the destination point within the navigation grid, and at least one selected active navigation object of the first subset of active navigation objects; and generate a first visual indication within the game environment identifying the at least one selected active navigation object of the first subset of active navigation objects.

Another embodiment discloses a non-transitory computer readable medium comprising computer-executable instructions for route navigation within a game environment of a game application that, when executed by a computer, causes the computer to: executing a game application comprising a game environment, the game environment comprising a plurality of navigation objects of structural elements, a navigation grid comprising a plurality of navigation links defining routes between the plurality of navigation objects, wherein each of the plurality of navigation objects is associated with one or more navigation links; determining a start point based, at least in part, on a location of a virtual character within the game environment, wherein the game environment further comprises a destination point for the virtual character within the game environment; determining an orientation of the virtual character within the game environment, identifying a first set of navigation objects based, at least in part, on the location of the character, the first set of navigation objects comprising one or more navigation objects of the plurality of navigation objects; filtering the first set of navigation objects based, at least in part, on an orientation threshold associated with the orientation of the virtual character within the game environment to generate a first subset of active navigation objects comprising a subset of navigation objects of the first set; determining a route between the start point and the destination point based, at least in part, on the navigation grid and one or more route determination factors, wherein the route comprises a first set of navigation links of the plurality of navigation links connecting the start point and the destination point within the navigation grid, and at least one selected active navigation object of the first subset of active navigation objects; and generating a visual indication within the game environment identifying the at least one selected active navigation object of the first subset of active navigation objects.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIGS. 2A-2F illustrate embodiments of a process for route generation within a game environment.

FIGS. 4A and 4B illustrate an embodiment of route navigation within a game environment.

FIGS. 5A and 5B illustrate another embodiment of route navigation within a game environment.

DETAILED DESCRIPTION OF EMBODIMENTS

Overview

Figure 1:
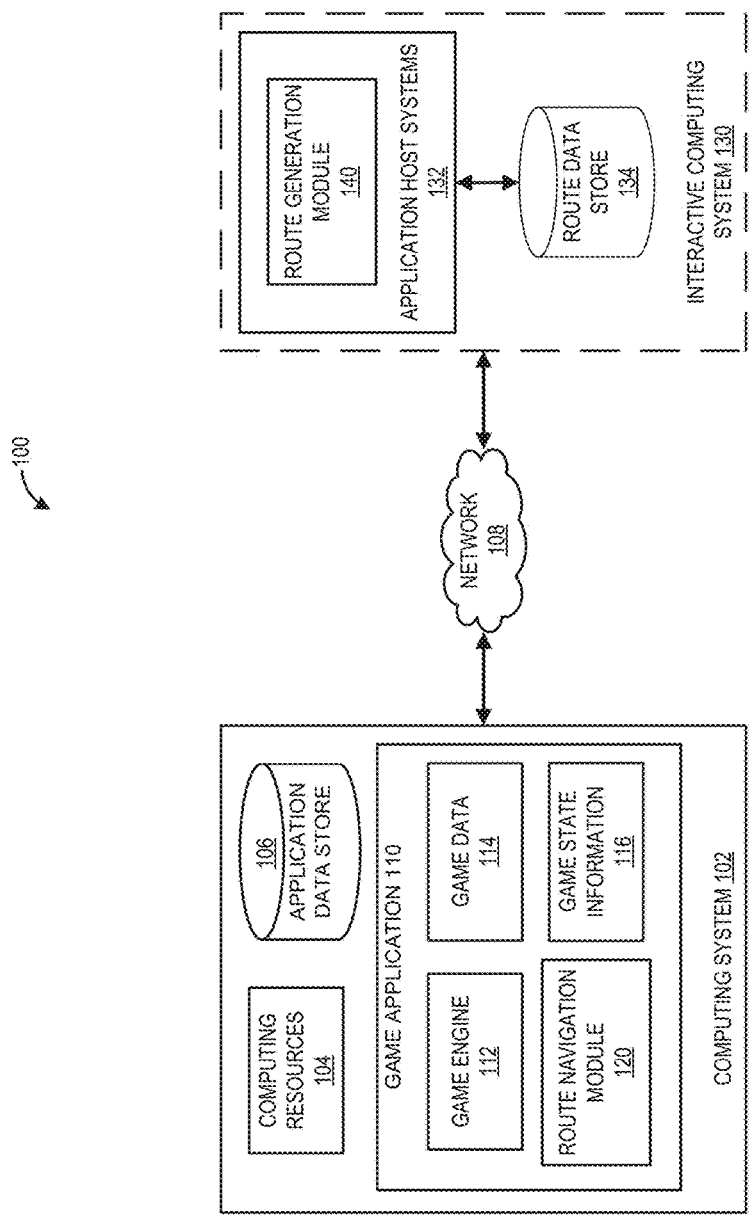
FIG. 1 illustrates an embodiment of a computing environment that can implement one or more embodiments of a route navigation system.

One of the problems encountered in video games is that the navigation options within game environments can be difficult for users to navigate. Within larger and larger environments within a game environment, it can be more difficult to prevent a character from getting lost or to sufficiently predict the path that a user may navigate in order to arrive at a final destination with in a game environment.

One solution to aspects of the problem is to provide dynamic navigation through the environment to an end goal or to an intermediate point within the game environment. The present disclosure relates to a system for generating routes within a game environment. The present disclosure also provides for navigating routes after generation of the routes during runtime of a game application. The route generation module can help address the problem of navigating a complex game environment in which a character traverses a game environment in order to arrive at a defined destination point.

A game environment can include thousands of objects that a character can interact with in order to traverse the game environment. These objects within the game environment can be referred to as navigation objects or nodes. The navigation objects can be in-game structures that the character can interact with or use to traverse the environment. For example, the navigation objects can include doors, walls, air conditioning units, ladders, ropes, zip lines, and/or other in-game structures that a character can interact with. The character can traverse from one navigation object to another to move through the environment. The game environment may be a city. A city can include thousands of objects within the game that a user can climb, grab, move over, or otherwise interact with in order to traverse the city environment. For example, a user may climb a ladder onto a rooftop, run along the rooftop and jump to a second rooftop, climb down a rope onto an air conditioning unit, and then jump into an open window.

The complexity of the game environment can make it difficult for a user to navigate the environment and determine which navigation objects to interact with in order to move through the environment. It can be beneficial to have a route navigation system that can aid the user by providing navigational aids. These navigational aids can provide visual indications to the user within the game environment in order to help direct the character to interactable navigation objects in order to traverse the environment. The navigational aids can be visual indicators, such as shaded objects (such as shading the object red), which indicate the next object in a series of objects that the user can traverse in order to arrive at a destination point. The navigation system can continue to indicate one or more paths the character can follow within the game to arrive at the destination point. If the character misses a navigation object or goes off course, the navigation system can dynamically reroute the system based on the information associated with the character, such as location and orientation.

In some embodiments, the navigation information generated by the route navigation module can be based on a route navigation grid generated by a route generation module. The route generation module can be configured to compile and aggregate route information and telemetry data associated with a plurality of users of the game application in order to generate a navigation grid. The navigation grid can include links and nodes that are used to form navigation routes between points within the navigation grid. Nodes within the navigation grid can be navigation objects within the game environment. The route generation module can be configured to automatically generate navigation links between navigation nodes within game environment based on telemetric data sourced from users of the game application. The navigation module can utilize the navigation grid to help users navigate characters within the game environments of the game application.

For purposes of this disclosure the term "user" can refer to a person that is operating a computing device in order to control the operation of a game application. For purposes of this disclosure the term "character" can refer to a virtual avatar or character that a user can control within a game application. The character can be a person, vehicle, object, and/or any entity that the user can control within the game application.

Overview of Video Game Environment

FIG. 1 illustrates an embodiment of a computing environment 100 for implementing a route generation system 120 and a route navigation system 140. The environment 100 includes a network 108, a plurality of user computing systems 102 and an interactive computing system 130, which includes application host systems 132 and a route data store 134. To simplify discussion and not to limit the present disclosure, FIG. 1 illustrates only one user computing system 102 and one interactive computing system 130, though multiple systems may be used. The user computing system 102 may communicate via a network 108 with the interactive computing system 130. Although only one network 108 is illustrated, multiple distinct and/or distributed networks 108 may exist.

Computing System

The computing system 102 includes computing resources 104 and an application data store 106. The user computing system 102 may have varied local computing resources 104 such as central processing units and architectures, memory, mass storage, graphics processing units, communication network availability and bandwidth, and so forth. Further, the user computing system 102 may include any type of computing system. For example, the user computing system 102 may be any type of computing device, such as a desktop, laptop, video game platform/console, television set-top box, television (for example, Internet TVs), network-enabled kiosk, car-console device, computerized appliance, wearable device (for example, smart watches and glasses with computing functionality), and wireless mobile devices (for example, smart phones, PDAs, tablets, or the like), to name a few. A more detailed description of an embodiment of a computing system 102 is described below with respect to FIG. 7.

Game Application

The user computing system 102 can execute a game application 110 based on software code stored at least in part in the application data store 106. The game application 110 may also be referred to as a videogame, a game, game code and/or a game program. A game application 110 should be understood to include software code that a computing device 102 can use to provide a game for a user to play. A game application 110 may comprise software code that informs a computing device 102 of processor instructions to execute, but may also include data used in the playing of the game, such as data relating to constants, images, route information, and other data structures. In the illustrated embodiment, the game application 110 includes a game engine 112, game data 114, game state information 116, and a route navigation module 120.

In some embodiments, the user computing system 102 is capable of executing a game application 110, which may be stored and/or executed in a distributed environment. For example, the user computing system 102 may execute a portion of a game and a network-based computing system, may execute another portion of the game. For instance, the game may be a massively multiplayer online role-playing game (MMORPG) that includes a client portion executed by the user computing system 102 and a server portion executed by one or more application host systems 132.

Game Engine

The game engine 112 can be configured to execute aspects of the operation of the game application 110 within the computing device 100. Execution of aspects of gameplay within a game application can be based, at least in part, on the user input received, the game data 114, and game state information 116. The game data 114 can include game rules, prerecorded motion capture poses/paths, environmental settings, constraints, skeleton models, route information, and/or other game application information.

The game engine 112 can execute gameplay within the game according to the game rules. Examples of game rules can include rules for scoring, possible inputs, actions/events, movement in response to inputs, and the like. Other components can control what inputs are accepted and how the game progresses, and other aspects of gameplay. The game engine 112 can receive the user inputs and determine in-game events, such as actions, jumps, runs, throws, attacks and other events appropriate for the game application 110. During runtime operation, the game engine 112 can read in game data 114 and game state information 116 to determine the appropriate in-game events.

In one example, after the game engine 112 determines the character events, the character events can be conveyed to a movement engine that can determine the appropriate motions the characters should make in response to the events and passes those motions on to a physics engine. The physics engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which generates a new frame for display to the user. The process can repeated for rendering each frame during execution of the game application. Though the process has been described in the context of a character, the process can be applied to any process for processing events and rendering the output for display to a user.

Game Data

The game data 114 can include game rules, prerecorded motion capture poses/paths, environmental settings, environmental objects, constraints, skeleton models, route information, and/or other game application information. At least a portion of the game data 114 can be stored in the application data store 106. In some embodiments, a portion of the game data 114 may be received and/or stored remotely, such as in the route data store 134, in such embodiments, game data may be received during runtime of the game application.

Game State Information

During runtime, the game application 110 can store game state information 116, which can include a game state, character states, environment states, scene object storage, route information and/or other information associated with a runtime state of the game application 110. For example, the game state information 116 can identify the state of the game application 110 at a specific point in time, such as a character position, character orientation, character action, game level attributes, and other information contributing to a state of the game application. The game state information can include dynamic state information that continually changes, such as character movement positions, and static state information, such as the identification of a game level within the game.

Route Navigation Module

The route navigation module 120 can perform various functions to provide navigation functionality within the game application 110 and can operate during runtime of the game application 110. The route navigation module 120 can use route information received from the interactive computing system 130 to perform various navigation functions. In some embodiments, the route navigation module 120 can receive route information from the interactive computing system 130 prior to execution of the game application, such as in an update to the game application. In some embodiments, the game application 110 may receive route information from the interactive computing system 130 during runtime. In such embodiments, the route navigation module 120 can dynamically update route information within the game application 110 based on the information received from the interactive computing system 130 during runtime. The route navigation module 120 can provide dynamic routing information within game environment. Functions of the route navigation module 120 can include dynamically determining a route of character from a determined position to a destination, providing visual indications of a route(s) for the character within the game environment, dynamically updating route information within the game environment, and other route navigation functions within the game environment. Various aspects of the operation of the route navigation module 120 are described in further detail below.

Interactive Computing System

The interactive computing system 130 can include one or more application host systems 132 and a route data store 134. The interactive computing system 130 may include one or more computing systems configured to execute a portion of the game application 110. In some embodiments, the one or more application host systems 132 can include one or more computing devices, such as servers and databases that may host and/or execute a portion of one or more instances of the game application 110. In certain embodiments, instead of or in addition to executing a portion of the game application 110, the application host systems 132 may execute another application, which may complement and/or interact with the application 110 during execution of an instance of the application 110, such as the route generation module 140.

Application Host System

The interactive computing system 130 may enable multiple users or computing systems to access a portion of the game application 110 executed or hosted by the interactive computing system 130. The interactive computing system 130 can include a route generation module 140. In some embodiments, the host application system 132 may execute a hosting system for executing various aspects of a game environment. For example, in one embodiment, the game application 110 can record the location of characters within the game environment. In some embodiments, the game application 110 may be a single player game in which the interactive computing system 130 provides additional functionality when connected to the instance of the game application 110. For example, the interactive computing system 130 can provide additional route information to the route navigation module 120 based on aggregated information received from a plurality of users operating the same game application 110. In some embodiments, the application host system 132 can provide a dedicated hosting service for hosting multiplayer game instances or facilitate the creation of game instances hosted by user computing devices. In some embodiments, the host application system 132 can provide a lobby or other environment for users to virtually interact with one another.

Route Generation Module

The route generation module 140 can provide route generation functionality for the game application 110. The route generation module 140 can be configured to compile and aggregate route information and telemetry data associated with a plurality of users of the game application 110. The route information and the telemetry data can be gathered and aggregated from a plurality of computing systems 102. In some embodiments, the route information can be gathered from computing systems 102 during operation of the game application.

The route generation module 140 can be configured to generate a navigation grid for virtual environments within the game application 110. In some embodiments, a game application 110 may include a plurality of game environments. The route generation module 140 may create a navigation grid for each game environment. The route generation module 140 can be configured to use telemetry data to automatically generate navigation links between navigation nodes within game environment. The automatically generated links can be combined with manually generated links to generate a navigation grid. Aspects of the operation of the route generation module 140 are discussed in more detail below.

Route Data Store

The interactive computing system 130 can include one or more route data stores 134 that are configured to store route information associated with game application 110 hosted by the interactive computing system 130 and/or the application host systems 132. The route data store 134 can include route information associated with the game application 110 that is generated and aggregated by the route generation module 140. For example, the route data store 134 can include navigation information received from users of game application, generated navigation grids, and other information used by the route generation module 140.

Network

The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

Route Generation

FIGS. 2A-2F illustrate embodiments of various functions and routines that can be implemented by the route generation module 140 in order to generate route information for the use within the game application 110. The route generation module can be configured to generate routes within a game environment 200. The route information can be provided by the route generation module 140 the route navigation module 120. In some embodiments, the route generation module 140 can be configured to generate a navigation grid for game environments within a game application 110.

Figure 2A:

FIG. 2A illustrates nodes 210 that have been created within a game environment 200. The illustrated game environment 200 does not display the virtual structures within the environment. Each node 210 can represent a navigation objects. Each node 210 within the game environment 200 can be interacted with or used by a character in the game environment 200 to move or otherwise traverse the environment 200.

A game environment can be formed from structural elements (such as meshes) that define the structures within an environment. For example, a game environment could be a city, a jungle, a spaceship, or any other type of virtual environment in accordance with the specific parameters of the game application. The game environments can be constructed in two-dimensional and three-dimensional environments. In some embodiments, characters within the environments can have the freedom to move in all directions according to a Cartesian coordinate system (such as along x, y, and z axes).

The game environment can be constructed from various structures that define the shape of the environment, but do not provide interactable objects for a character within the environment. For example, the building may be formed from a combination of navigation objects that a character can interact with, such as certain walls, ledges, ladders, and other elements defined by the application, and passive elements that define the shape and appearance of the building, but do not provide an interactable object for the character, such as certain walls, artwork, environmental effects, and other elements as defined by the application. The number and type of navigation objects within a game application 110 can be defined during creation of the game environment and updated during gameplay.

Navigation Object Placement

FIG. 2A illustrates an embodiment of the placement of nodes 210 within a game environment 200. The plurality of nodes 210 can be distributed throughout the environment as defined by the creator of the environment. An example embodiment of nodes within a game environment is illustrated in FIGS. 4 and 5.

The nodes 210 can be interacted with by a character within the game environment. The nodes 210 can be defined types of navigation objects that have defined behaviors and characteristics according to the type of the object. A node can have end points, interaction points, directional information, and other information that defines how a character can interact with the node. For example, an object may be a zip line that has a defined start point and end point. The character can only interact with the zip line at the start point and is moved from the start point to the end point automatically. Another example, the object can be a ledge on a roof that the character can move across. The character can interact with the ledge at any point (such as mounting and dismounting from the ledge), and can move back and forth along the edge. Additional examples of nodes can include, such as, for example, jump boards, fences, pipes, zip lines, rope swings, ladders, and the like.

The character can interact with the objects in order to traverse game environment 200. Based on the game application, the character can perform various actions to interact with nodes, such as, for example, running, climbing, jumping, sliding, wall jumping, and/or other actions according the specific game application. Each defined node 210 provides an at least one interactable navigation object for a character within the game environment.

Telemetry Data

Figure 2B:

FIG. 2B illustrates an embodiment of telemetry data 220 collected from a plurality of users within a game environment 200. The telemetric data 220 can be recorded from users during gameplay sessions of the game application. As illustrated in FIG. 2B, the telemetric data 220 is overlaid with the nodes 210 within the game environment 200. The route generation module 140 can aggregate the telemetric data 220 from individual players within the game environment 200. The route generation module 140 can record, or otherwise track, movement of the characters with the game environment 200. In some embodiments, the telemetric data 220 can include interactions that a player performs with nodes 210 within the game environment 200. In some embodiments, the route generation module 140 may track the movement of the users at defined time periods or at defined distances. For example, a character moving through the game may send out a ping or send out information to the route generation module 140 identifying the location of the character at a defined period of time, such as every five seconds. The game application 110 may send information identifying the location of the character at a defined change in distance, such as every 5 meters. In some embodiments, the information may be provided periodically, aperiodically, and/or based on event information occurring within the game environment, such as, for example, when the character interacts with a node in the game environment. The characters within the game environment can generate hundreds of thousands of data points. Each set of information can be associated with a specific character. In some embodiments, the route generation module 140 can evaluate the route of a character independent of other character routes.

The telemetric data 220 illustrated in FIG. 2B illustrates routes that have been traversed by characters within the game environment. The lines are thicker and darker and more characters traverse the same routes. The route generation module 140 can determine the density and frequency of travel along routes within the game environment to determine whether characters are traversing intended routes within the game environment. In some embodiments, the route generation module 140 can determine additional information from the telemetry data 220, such as frequency data that indicates the frequency of usage of nodes 210 within the game environment 200. The frequency data can be used to determine high traffic nodes and low traffic nodes. The frequency data may be used to categorize and prioritize nodes. In some embodiments, the categorization and prioritization information can be used for route navigation selection purposes.

Link Generation

FIG. 2C illustrates an embodiment of the generation of links 230 by the route generation module 140 based on the telemetric data 220. The route generation module 140 can utilize an algorithm to process the telemetry data 220 in order to determine links 230 between nodes 210 within the game environment 200. In some embodiments, route generation module 140 can use an algorithm to parse telemetric data 220 associated with each user. The route generation module 140 can use information such as the time, speed, and/or movement information associated with telemetric data to verify that a node 210 was used by a character. In some embodiments, the telemetric data can include actions performed by the character, such as interacting with a node 210. The route generation module 140 can dynamically generate links 230 between nodes 210. The link 230 can include a start point 232 and an end point 234. In some embodiments, the start point 232 and the end point 234 can correspond to the location of a node 210. The route generation module 140 can determine direction information associated with a link 230. For example, some links 230 may be unidirectional and some links may be bidirectional. A link 230 can refer to a travel path between nodes 210. The travel path between nodes can be used for generation of a navigation grid of the game environment 200.

Link Filtering

Figure 2D:
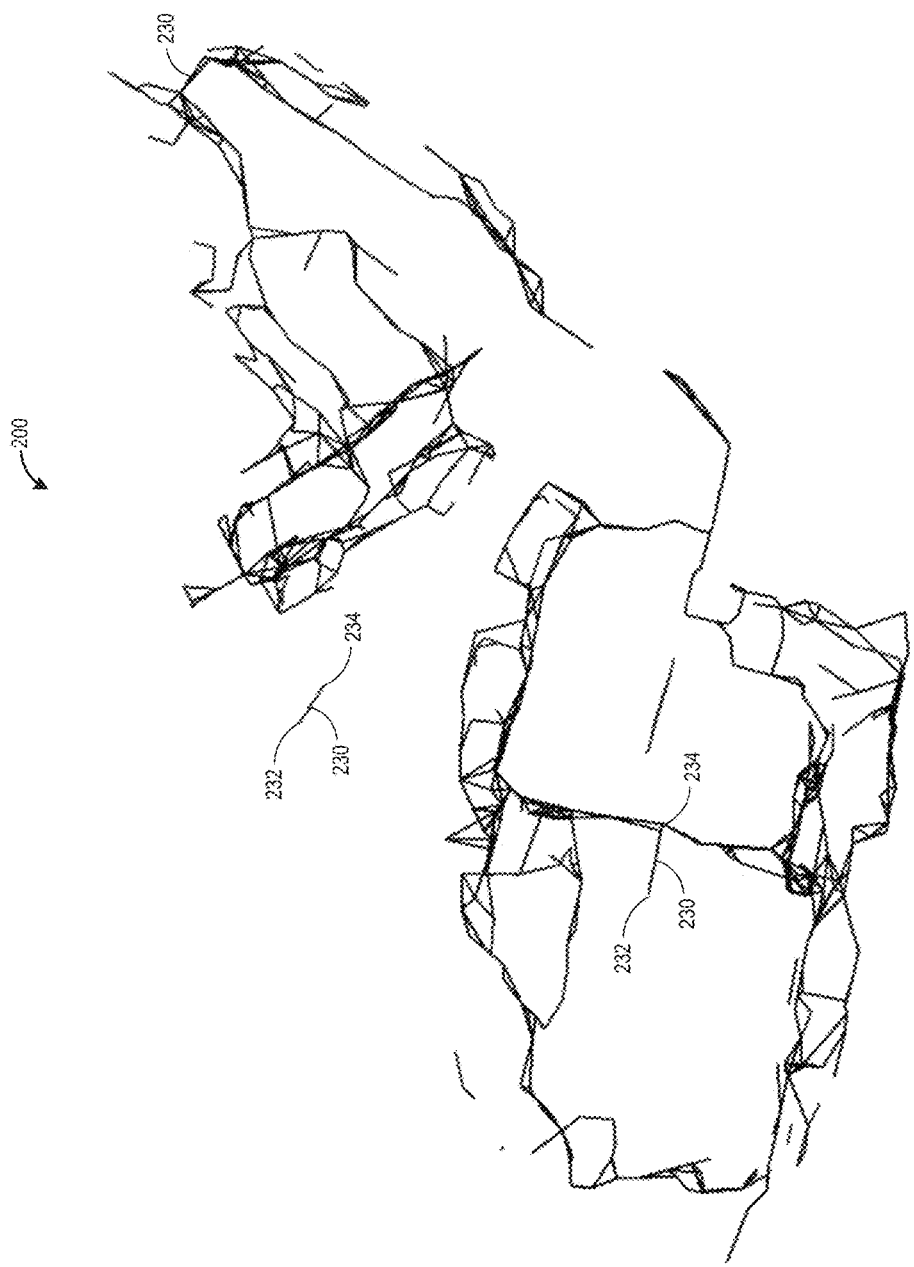

FIG. 2D illustrates an embodiment of the links after filtering the telemetric data to remove bad links. In some embodiments, frequency data can be compared to the generated links to determine usage of a link. In some embodiments, links that have usage below a threshold level can be filtered out. After the bad links have been removed, the route generation module 140 can generate a navigation grid based on the telemetric data. The generation of the navigation grid may be an ongoing process as the telemetric data may continue to be updated. For example, if the game application 110 is online and continually receives information from additional users, the telemetric data can be constantly updated at regular intervals, at defined intervals, or as needed. In some embodiments, the route generation module 140 can continue to implement the processes described herein to evaluate the telemetric data in order to determine additional links and travel paths for characters within the game environment.

Manual Links

Figure 2E:
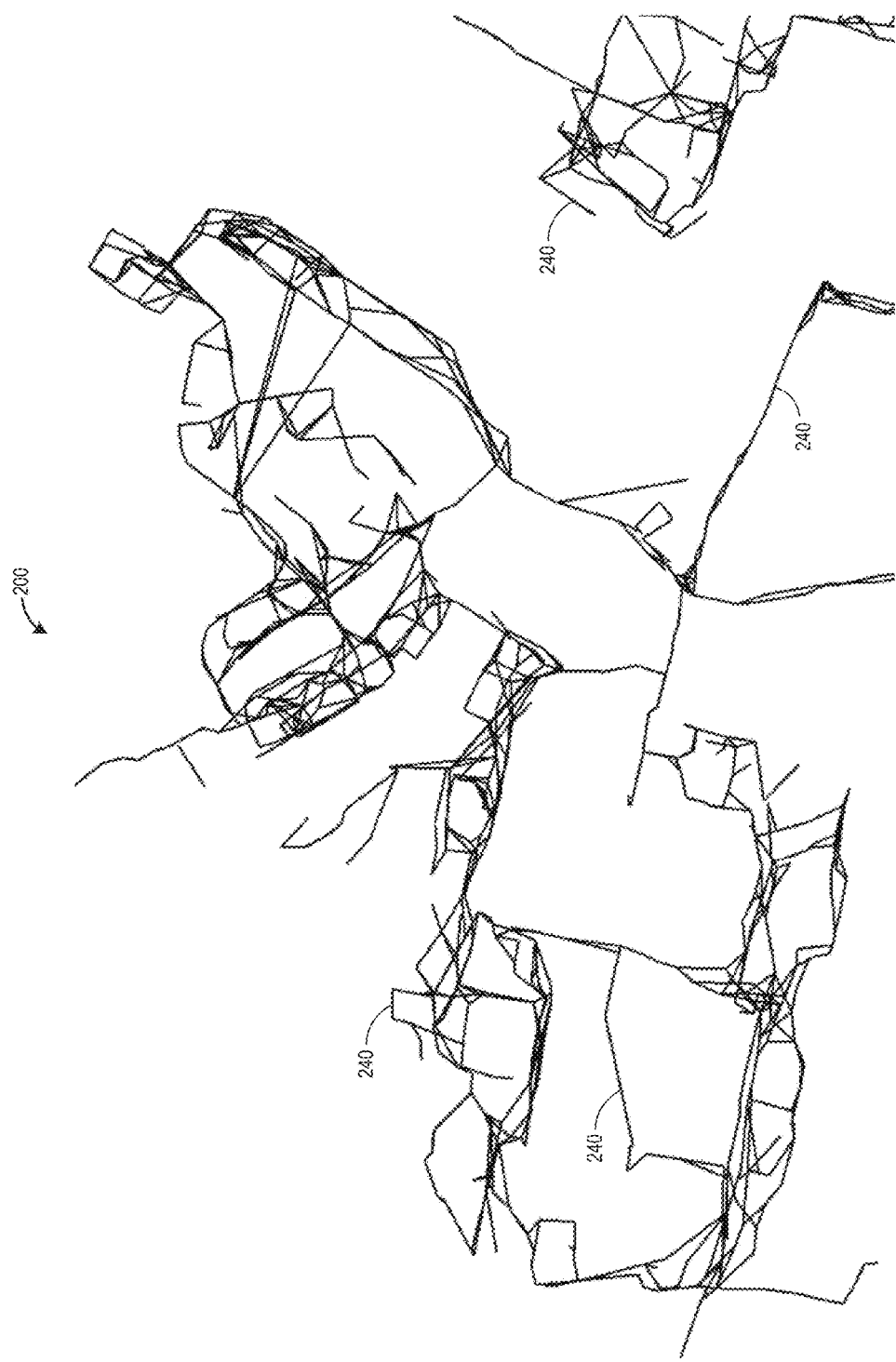

FIG. 2E illustrates an embodiment of manual links 240 that have been manually generated. In some embodiments, the manual links 240 can be generated by creators of the game environment. In some embodiments, the system may provide an interface for users to create manual links within a game environment. For example, a game may include an interface for users to design and build levels and challenges within the game environment. The manual link information can form a navigation grid.

Navigation Grid

Figure 2F:
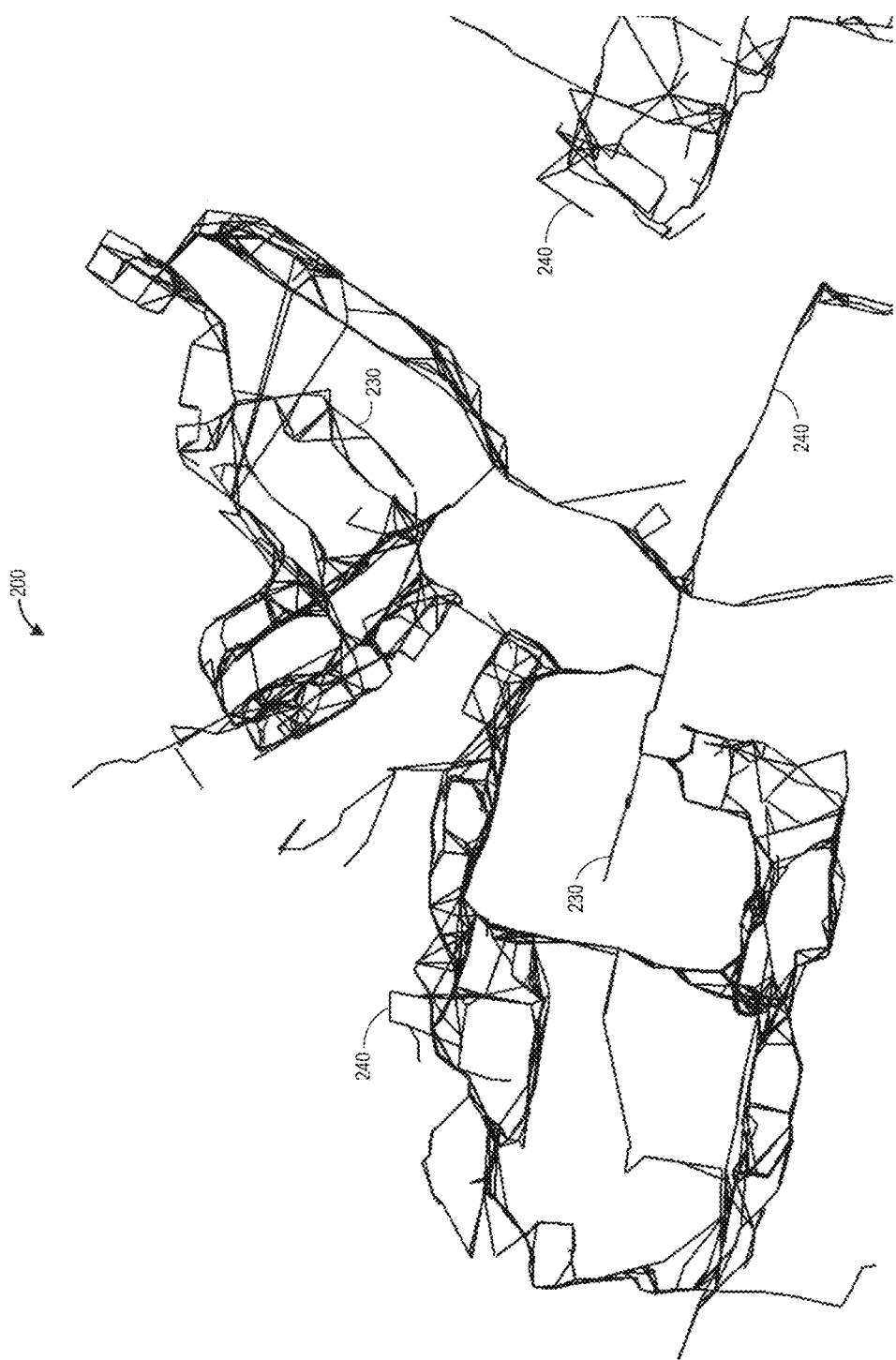

FIG. 2F illustrates an embodiment of a navigation grid that includes manual links and telemetric links. In some embodiments, the manual links 240 can be compared to the telemetric links 230 in order to evaluate the data sets. For example, a manual link 240 may be used verify different routes between the telemetric links 230 and the manual links 240. In some instances, telemetric links 230 can help fill in gaps in routes of the manual links 240.

The telemetric links 230 and the manual links 240 can be used to generate a navigation grid. The navigation grid is formed from the plurality of links (for example, manual and telemetric links) and connected by nodes (for example, navigation objects). The navigation grid can include navigation information associated with each link. The navigation information can include, information, such as a priority value (for example, a weighted value), a time value (for example, the time it takes to traverse a link), directional information (for example, unidirectional or bidirectional), a start point (for example, a first node), an end point (for example, a second node), and other information that can be used by the route navigation module to generate a route 120. In some embodiments, a difficulty level or skill level can be associated with a link. The navigation grid can be stored in the route data store 134, and/or provided for storage by the application data store 106 on the user computing device. The navigation grid can be used during runtime operation of the game application 110.

Route Generation Process

Figure 3:
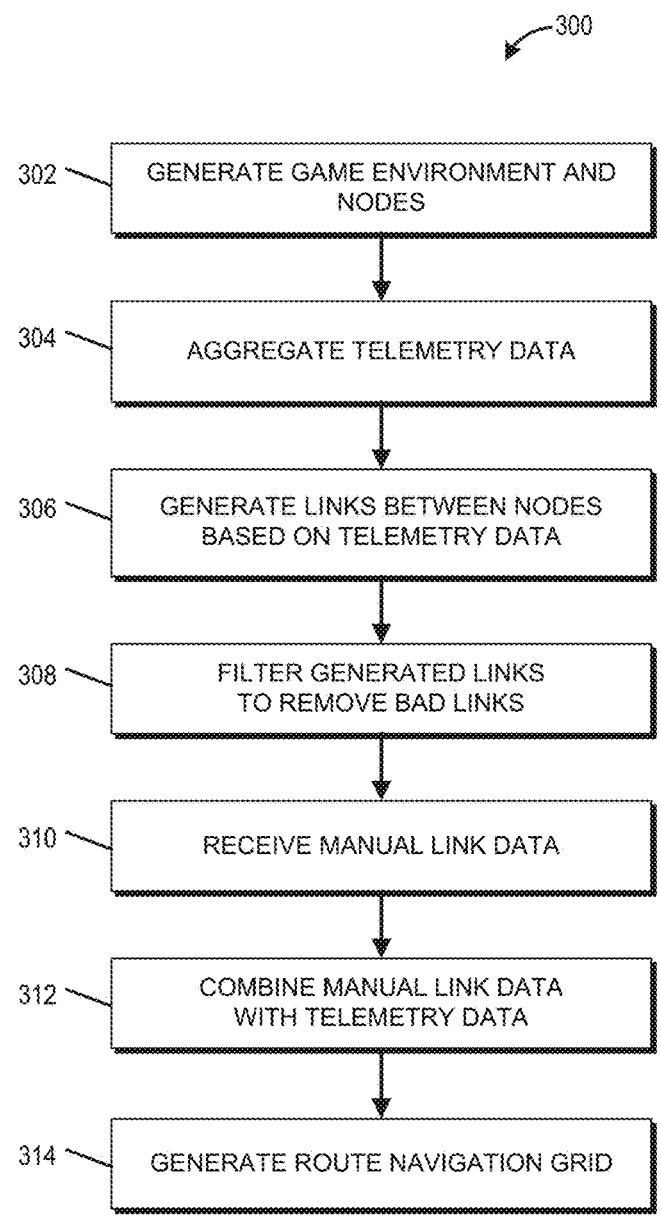
FIG. 3 illustrates a flowchart of an embodiment of a route generation process.

FIG. 3 illustrates an embodiment of a flowchart for a process for generating routes within a game environment of a game application. The process 300 can be implemented by any system that can aggregate and process telemetry data for a game application. For example, the process 300, in whole or in part, can be implemented by a game application 110, a game engine 114, a route generation module 120, an interactive computing system 130, an application host system 132, and/or another system. Although any number of systems, in whole or in part, can implement the process 300, to simplify discussion, the process 300 will be described with respect to particular systems. Further, although embodiments of the process 300 may be performed with respect to variations of systems comprising various game application environments, to simplify discussion, the process 300 will be described with respect to the interactive computing system 130.

At block 302, the virtual game environment and nodes are created. The game environment can include a plurality of nodes within the virtual environment. Each node can be a navigation object that a character can interact with in the game environment. The character can use the nodes to move through the game environment.

At block 304, telemetric data can be aggregated from a plurality of users. The route generation module 140 can aggregate the telemetric data 220 from the users operating the game application. The route generation module 140 can record, or otherwise track, movement of the characters with the game environment 200. In some embodiments, the telemetric data can include time, speed, movement, and/or interaction data associated with the character in the game environment. In some embodiments, the route generation module 140 may record telemetric data based on defined time periods or movement of defined distances within the game environment.

At block 306, the telemetric data can be used to generate links between nodes. The route generation module 140 can utilize an algorithm to process the telemetry data 220 in order to determine links 230 between nodes 210 within the game environment 200. The route generation module 140 can use information such as the time, speed, movement, and/or interaction information associated with telemetric data to verify that a node 210 was used by a character.

At block 308, the link data can be filtered to remove bad links. In some embodiments, links that have usage below a threshold level can be filtered out of the telemetric link data. After the bad links have been removed, the route generation module 140 can generate a navigation grid from the telemetric data.

At block 310, manual link data can be received. In some embodiments, the manual links 240 can be generated by creators and/or users of the game environment. At block 312, the telemetric link data and the manual link data can be merged. At block 314, a navigation grid can be generated from the telemetric link data and the manual link data. The navigation grid is formed from the plurality of links (for example, manual and telemetric links) and connected by nodes (for example, navigation objects). The navigation grid can include navigation information associated with each link. The navigation information can include, information, such as a priority value (for example, a weighted value), a time value (for example, the time it takes to traverse a link), directional information (for example, unidirectional or bidirectional), a start point (for example, a first node), an end point (for example, a second node), difficulty of the route, and/or other information that can be used by the route navigation module to generate a route 120.

Embodiments of Route Navigation Process

Figure 4A:
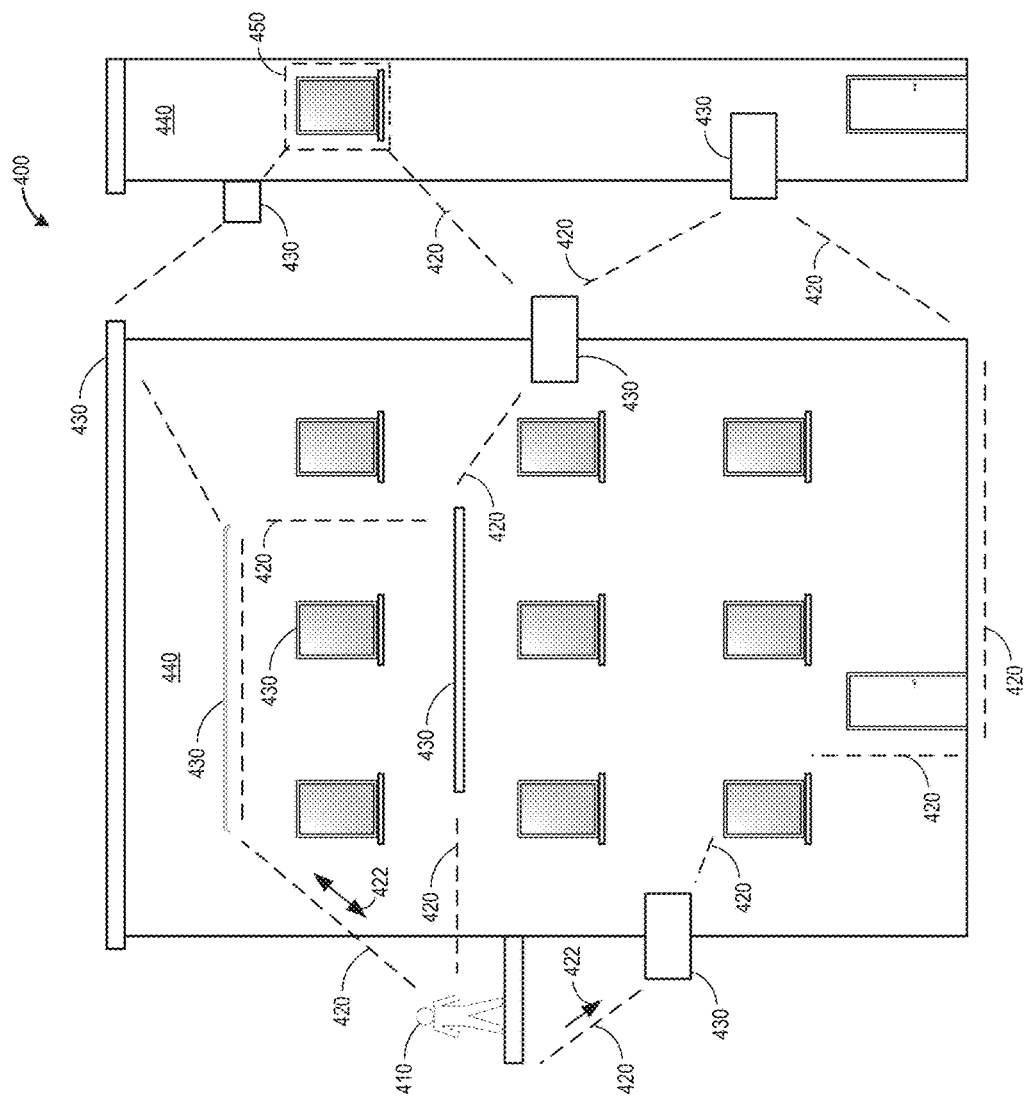

FIGS. 4A and 4B illustrate an embodiment of a game environment illustrating aspects of route navigation within the game application 110. FIG. 4A illustrates an example interface of a game environment 400. A character 410 is positioned at a first location and has a destination location 450. The game environment 400 comprises navigation links 420, navigation nodes 430, and passive objects 440. The character 410 can move through the game environment 400 by interacting with the various nodes 430 within the game and moving along the links 420 between the nodes 430. The link 420 and node 430 information can be provided by a navigation grid generated by the route generation module.

The links 420 may include directional information 422. The navigation module 120 can use the directional information to determine availability of a link 420 to the character during navigation. In the illustrated example, there are various links that the character can follow in order to arrive at the destination location 450. In some instances, a single node 430 may have multiple different links extending from the node. Each link 420 can have associated navigation characteristics. The navigation characteristics can be used by the route navigation module 120 to determine routes. The navigation characteristics associated with a link can include characteristics such as, for example, a priority value, a time value (for example, the time it takes to traverse a link), directional information of the link (for example, unidirectional, bidirectional), and/or other navigation characteristics. Each link can have different navigation characteristics. The priority value can be a weight that is assigned to a link during generation of the navigation grid. In some embodiments, manually created links can have a greater weighted value than telemetric created links. For example, a manual route may be a preferred route and links associated with the preferred route can have a greater weighted value than other links. In some embodiments, the weight value associated with a link can be based on the frequency that the route was traversed during the route generation process.

The route navigation module 120 can determine a route or routes that a character can follow to arrive at the destination location 450. The route selection process can include evaluating one or more navigation characteristics associated with each link. The route selection process can also include evaluating one or more game state factors. The game state factor can include factors, such as, for example, the location of the character, the distance of the character to a node, the time to reach each node, character orientation information (for example, the portion of the game environment visible to the user), and/or other game state information, and route navigation information. In some embodiments, the route navigation module 120 can use various routing algorithms (such as, for example, an A* routing algorithm) to determine the quickest route between the start and end points. The route navigation module 120 can continue to analyze the routes during runtime and dynamically update the routes as the character continues moving through the game environment.

FIG. 4B illustrates an embodiment of the generation of visual indications 460 by the route navigation module within the game environment for the user. In the illustrated embodiment, the character has two recommended routes that can be followed to arrive at the destination point 450. The route navigation module 120 has generated a first indication 460 for the higher route and a second visual indication 462 for the middle route. In some embodiments, the route navigation module 120 can select a single route. In some embodiments, the route navigation module 120 can select or two or more routes.

The visual indications can help the user see a selected route within the game environment 400. In some embodiments, the visual indications can appear on or near the node that a character can interact with to follow a selected route. The type of visual indication can vary depending on the type of node 430. The visual indications 460 can modify the appearance of a node 430 within the game environment. For example, the node 430 may be shaded a specific color (for example, red or blue), to alter the appearance and highlight the node for the user within the game environment. In some embodiments, the visual indication will remain on the node until the user has interacted with the node or the user is within a defined distance of the node. In some embodiments, the visual indication may remain until the user has moved passed the node to the next node on the route. In some embodiments, multiple nodes along a route will include a visual indication. For example, a determined number of nodes may have a visual indication and as the character traverses each node, the next node receives the visual indication. In some embodiments, the visual indication can have different visual effects for different types of nodes. For example, some nodes may include footsteps or an arrow indicating a location of the node or specifying the type of interaction required by the character. In some embodiments, a node may have multiple options for interacting with the node. For example the edge of a roof can be used to climb onto the roof or a character can hang and move along the edge of the roof. In such an embodiment, the visual indication may provide directions to the user for interacting with the node.

Figure 5A:
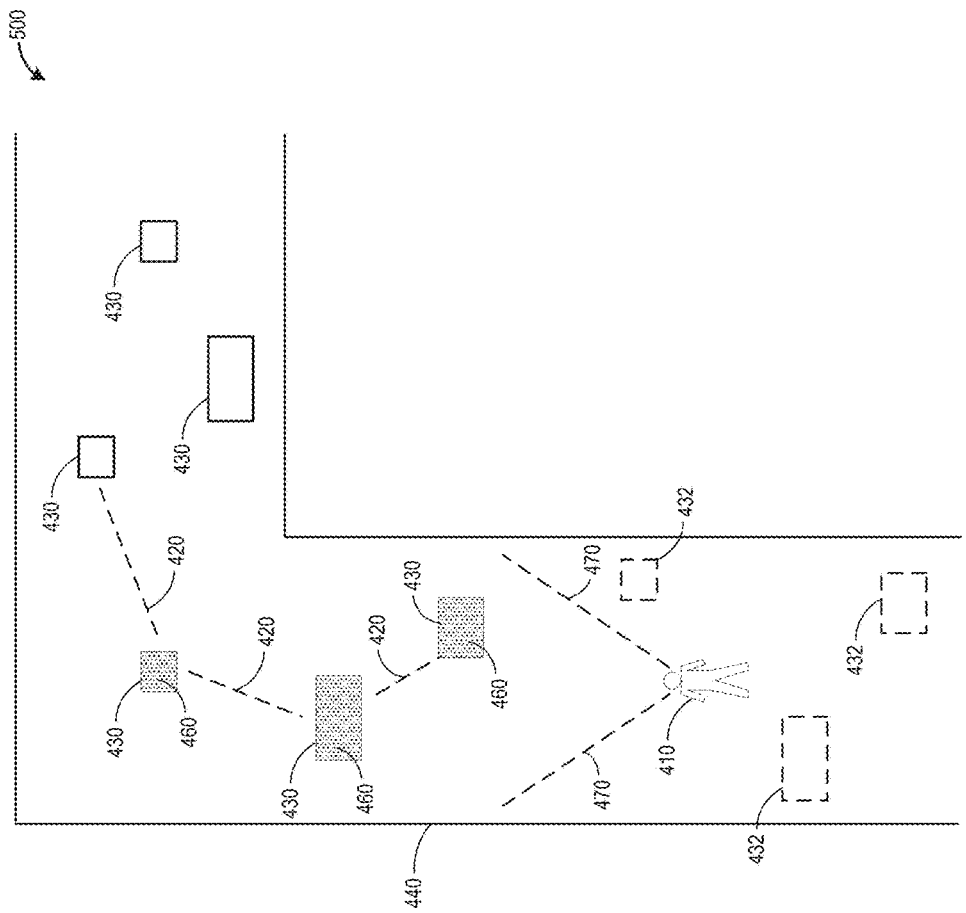

FIGS. 5A and 5B illustrate an embodiment of a top down view of a character 410 within a game environment 500. The orientation and field of view of the character 410 is illustrated by dashed lines 470. In some embodiments, the route navigation module 120 can filter nodes 430 based on the orientation of the character within the game environment 500. The route navigation module can use the facing orientation information to filter routes that use nodes that are not within view of the character within the game environment. For example, in the illustrated embodiment, nodes 432 have been filtered and are not being considered for rout selection. The orientation filter can be a defined view angle of the character within the game environment. In some embodiments, the orientation may filter out nodes that are not within the user interface displayed to the user. In some embodiments, the nodes within the user interface may be filtered. For example, portion of the user interface that obscure the view of the user may be used to filter nodes positioned within these portions of the user interface. In some embodiments, the route navigation module may filter based on a view angle of the character within the virtual environment, for example, it may be a 45° view angle of the character, a 90° view angle of the character, or another determined threshold. The route navigation module can use the filter to remove nodes from consideration for route determination and improve the efficiency of route selection. The route navigation module, can update the route as the orientation of the character changes. In some embodiments, the location of the character can also be used to filter nodes that are outside of a defined distance or travel time from the character as a start point for a route.

FIG. 5A further illustrates visual indications 460 on a plurality of nodes positioned in front of the user. In some embodiments, the route navigation module 120 can provide visual indications 460 on a plurality of nodes 430 on a selected route 420, as illustrated. In some embodiments, the route navigation module may selectively provide visual indications to nodes 430 within the selected route 420.

With additional reference to FIG. 5B, the route navigation module can selectively determine nodes to indicate. This can help reduce unnecessary information that is displayed to the user. For example, in a linear section of a route, the route navigation module may only provide a visual indication for the last node 430 in a line. The next node can be one that is not visible to the user. In some embodiments, there may be an angular threshold that is used to determine whether nodes are within a defined linear relationship relative to each other.

Route Navigation Process

Figure 6:
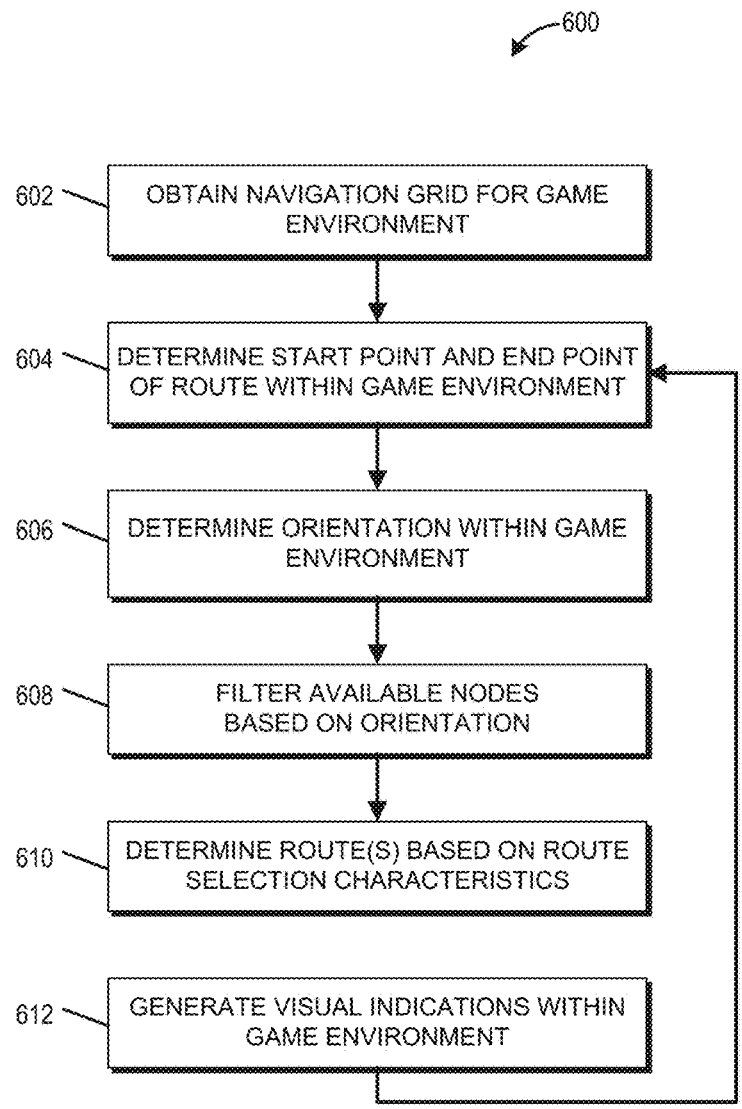
FIG. 6 illustrates an embodiment of a flowchart of an embodiment of a route navigation process.

FIG. 6 illustrates an embodiment of a flowchart for a process for route navigation of a character within a game environment of a game application. The process 600 can be implemented by any system that can execute and run a game application. For example, the process 600, in whole or in part, can be implemented by a game application 110, a game engine 114, a route navigation module 130, an interactive computing system 130, an application host system 132, and/or another system. Although any number of systems, in whole or in part, can implement the process 600, to simplify discussion, the process 600 will be described with respect to particular systems. Further, although embodiments of the process 600 may be performed with respect to variations of systems comprising various game application environments, to simplify discussion, the process 600 will be described with respect to the computing system 102.

At block 602, the navigation grid is obtained for the game environment. Navigation grid can include links and nodes that are used for navigation and selection of routes for character a character within the game environment. The navigation grid can include navigation information that can be used for the determination of routes. For example, the links can include navigation characteristics associated that can include characteristics such as, for example, a priority value, a time value (for example, the time it takes to traverse a link), directional information of the link (for example, unidirectional, bidirectional), and/or other navigation characteristics.

At block 604, the route navigation module determines the start point and end point of the route within the game environment. The start point can be determined based on the location of the character within the game environment. The end point or destination location can be based on the specific rules and parameters of the game environment. The end point may a final destination within a game level. In some embodiments, the end point may be an intermediate destination point within the game environment.

At block 606, the route navigation module determines the orientation of the character within the game environment. The orientation of the character can determine the view of the user interface for the user. The orientation of the character can be different from the view of the user. For example, the view of the user can be based on the position of an in-game camera. The orientation of the character and the user interface view of the user can be determined.

At block 608, the nodes within the game environment are filtered based on the orientation of the character. In some embodiments the orientation can be used to remove nodes from used for the determination of a route that are not within a defined orientation threshold of the character orientation and/or the view of the user interface. In some embodiments, the route navigation module can filter available start points based on nodes within a defined distance of the character in the game environment. In some embodiments, the location and orientation information can be used to filter nodes.

At block 610, the navigation module determines one or more routes based on one or more route selection characteristics. The route selection process can include determining evaluating one or more navigation characteristics such as, for example, for example, a priority value, a time value (for example, the time it takes to traverse a link), directional information of the link (for example, unidirectional, bidirectional), and/or other navigation characteristics, and/or other navigation factors. The route selection process can also include evaluating one or more game state factors, such as, for example, the location of the character, the distance of the character to a node, the time to reach each node, character orientation information (for example, the portion of the game environment visible to the user), and/or other game state information, and route navigation information., and/or other game state information.

At block 612, the navigation module generates visual indication within the game environment. The visual indications provide navigation directions for the character within the game environment in order to arrive at the destination. The process can continue to generate visual indication as the character moves through the environment. For example, as the character moves between nodes within a selected route, the navigation module can continue to generate visual indication highlighting the route for the user. In some embodiments, the process can continually, re-evaluate routes based on to determine one or more different navigation routes. For example, if a character stops and changes orientation, the route navigation module can determine one or more new routes based on the update information. Additionally, the navigation module can generate additional routes dynamically at that each node to provide additional visual indications for available routes that a user can traverse in order to arrive at the endpoint.

Overview of Computing Device

Figure 7:
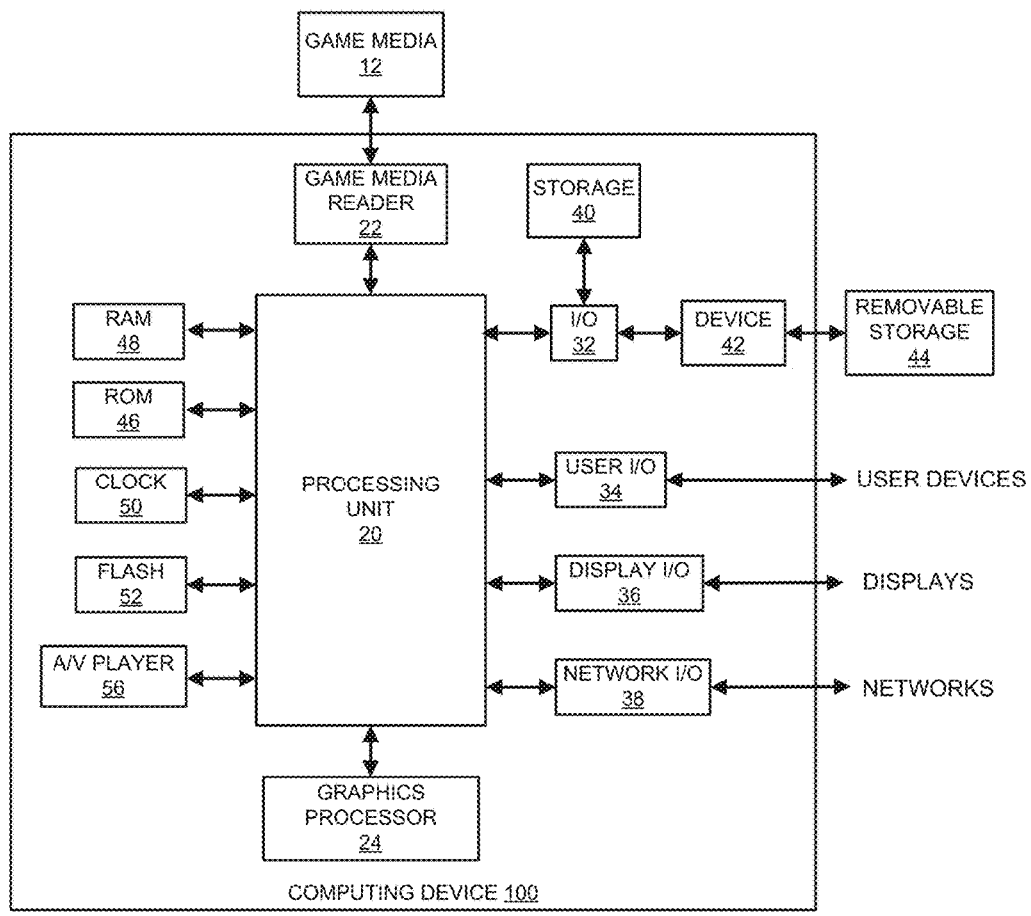
FIG. 7 illustrates an embodiment of a computing device.

FIG. 7 illustrates an embodiment of computing device 10 according to the present disclosure. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for route navigation within a game environment of a game application:
   by a hardware processor configured with computer executable instructions,
      executing a game application comprising a game environment and a navigation grid, the game environment comprising a plurality of navigation objects, wherein each navigation object is a structural element within the game environment that a virtual character can interact with using one or more defined types of movement actions, the navigation grid comprising a plurality of navigation links defining routes between the plurality of navigation objects, wherein each of the plurality of navigation objects is associated with one or more navigation links;
      determining a start point based, at least in part, on a location of a virtual character within the game environment, wherein the game environment further comprises a destination point for the virtual character within the game environment;
      determining an orientation of the virtual character within the game environment;
      identifying a first set of navigation objects based, at least in part, on the location of the virtual character, the first set of navigation objects comprising one or more navigation objects of the plurality of navigation objects;
      filtering the first set of navigation objects based, at least in part, on an orientation threshold associated with the orientation of the virtual character within the game environment to generate a first subset of active navigation objects comprising a subset of navigation objects of the first set;
      determining a route between the start point and the destination point based, at least in part, on the navigation grid and one or more route determination factors, wherein the route comprises a first set of navigation links of the plurality of navigation links connecting the start point and the destination point within the navigation grid, and at least one selected active navigation object of the first subset of active navigation objects;
      generating a first visual indication within the game environment identifying at least a first active navigation object of the first subset of active navigation objects;
      receiving, from a user input device, input to interact with the first active navigation object using a first movement action associated with the first active navigation object;
      executing, by the virtual character, the first movement action based at least in part on the received input to interact with the first active navigation object, wherein the virtual character uses the first active navigation object within the game environment in response to execution of the first movement action such that the virtual character traverses the first active navigation object to move from a first position within the game environment to a second position within the game environment;
      removing the first visual indication from the first active navigation object; and
      generating a second visual indication on at least a second active navigation object of the first subset of active navigation objects based at least in part on the first movement action performed by the virtual character.

2. The computer-implemented method of claim 1, wherein the plurality of navigation objects each comprise an object type defining a type of interaction between the virtual character and the navigation object.

3. The computer-implemented method of claim 1 further comprising updating the route based on a change of the orientation of the virtual character within the game environment.

4. The computer-implemented method of claim 1 further comprising generating a second visual indication after the virtual character interacts with one of the at least one selected active navigation object associated with the first visual indication.

5. The computer-implemented method of claim 1, further comprising generating a second visual indication identifying a second selected active navigation objects of the first subset of active navigation objects.

6. The computer-implemented method of claim 5, wherein the first visual indication and the second visual indication are associated with different determined routes.

7. The computer-implemented method of claim 5, wherein the first visual indication and the second visual indication are associated with the same determined route.

8. The computer-implemented method of claim 1, wherein the orientation threshold is based on the orientation of a user interface output to a user.

9. A computing system comprising:
   a data store storage device configured to store computer readable instruction configured to execute a game application and a navigation grid comprising a plurality of navigation links defining routes between a plurality of navigation objects, wherein each of the plurality of navigation objects is associated with one or more navigation links and each navigation object is a structural element within a game environment that a virtual character can interact with using one or more defined types of movement actions;
   a processor configured to execute the game application, the game application configured to generate the game environment including a plurality of navigation objects, the game application comprising a route navigation module configured to:
      determine a start point based at least in part on a location of a virtual character within the game environment, wherein the game environment comprises a destination point for the virtual character within the game environment;
      determine an orientation of the virtual character within the game environment;
      identify a first set of navigation objects based, at least in part, on the location of the virtual character, the first set of navigation objects comprising one or more navigation objects of the plurality of navigation objects;
      filter the first set of navigation objects based, at least in part, on an orientation threshold associated with the orientation of the virtual character within the game environment to generate a first subset of active navigation objects comprising a subset of navigation objects of the first set;

determine a route between the start point and the destination point based, at least in part, on the navigation grid and one or more route determination factors, wherein the route comprises a first set of navigation links of the plurality of navigation links connecting the start point and the destination point within the navigation grid, and at least one selected active navigation object of the first subset of active navigation objects;

generate a first visual indication within the game environment identifying at least a first active navigation object of the first subset of active navigation objects;

receive, from a user input device, input to interact with the first active navigation object using a first movement action associated with the first active navigation object;

execute, by the virtual character, the first movement action based at least in part on the received input to interact with the first active navigation object, wherein the virtual character uses the first active navigation object within the game environment in response to execution of the first movement action such that the virtual character traverses the first active navigation object to move from a first position within the game environment to a second position within the game environment;

remove the first visual indication from the first active navigation object; and generate a second visual indication on at least a second object of the first subset of active navigation objects based at least in part on the first movement action performed by the virtual character.

10. The computing system of claim 9, wherein the route navigation module is further configured to generate a second visual indication on a second selected active navigation object.

11. The computing system of claim 10, wherein each of the individual visual indications is associated with a different determined route.

12. The computing system of claim 9, wherein the orientation threshold is based on the orientation of a user interface output to a user.

13. The computing system of claim 9, wherein the navigation grid is generated based on telemetric navigation data provided by a plurality of users.

14. The computing system of claim 9, wherein the game environment is a three dimensional environment or a two-dimensional environment.

15. The computing system of claim 9, wherein each of the visual indications modifies an appearance of the corresponding navigation object.

16. A non-transitory computer readable medium comprising computer-executable instructions for route navigation within a game environment of a game application that, when executed by a computer, causes the computer to:

executing a game application comprising a game environment and a navigation grid, the game environment comprising a plurality of navigation objects, wherein each navigation object is a structural element within the game environment that a virtual character can interact with using one or more defined types of movement actions, the navigation grid comprising a plurality of navigation links defining routes between the plurality of navigation objects, wherein each of the plurality of navigation objects is associated with one or more navigation links;

determining a start point based, at least in part, on a location of a virtual character within the game environment, wherein the game environment further comprises a destination point for the virtual character within the game environment;

determining an orientation of the virtual character within the game environment, identifying a first set of navigation objects based, at least in part, on the location of the virtual character, the first set of navigation objects comprising one or more navigation objects of the plurality of navigation objects;

filtering the first set of navigation objects based, at least in part, on an orientation threshold associated with the orientation of the virtual character within the game environment to generate a first subset of active navigation objects comprising a subset of navigation objects of the first set;

determining a route between the start point and the destination point based, at least in part, on the navigation grid and one or more route determination factors, wherein the route comprises a first set of navigation links of the plurality of navigation links connecting the start point and the destination point within the navigation grid, and at least one selected active navigation object of the first subset of active navigation objects;

generating a first visual indication within the game environment identifying at least a first active navigation object of the first subset of active navigation objects;

receiving, from a user input device, input to interact with the first active navigation object using a first movement action associated with the first active navigation object;

executing, by the virtual character, the first movement action based at least in part on the received input, wherein the virtual character uses the first active navigation object within the game environment in response to execution of the first movement action such that the virtual character traverses the first active navigation object to move from a first position within the game environment to a second position within the game environment;

removing the first visual indication from the first active navigation object; and generating a second visual indication on at least a second object of the first subset of active navigation objects based at least in part on the first movement action performed by the virtual character.

17. The non-transitory computer readable medium of claim 16 further comprising updating the route based on a change of the orientation of the virtual character within the game environment.

18. The non-transitory computer readable medium of claim 16 further generating a second visual indication after the virtual character interacts with one of the at least one selected active navigation object associated with the visual indication.

19. The non-transitory computer readable medium of claim 16, wherein generating the visual indication comprises providing individual visual indications on two or more navigation objects.

20. The non-transitory computer readable medium of claim 19, wherein each visual indication is associated with a different determined route.

* * * * *